Aug. 6, 1935. G. A. H. NUYTS 2,010,437
COLLAPSIBLE AUTOMATIC ERECTION EGG BOX
Filed May 11, 1934 3 Sheets-Sheet 1
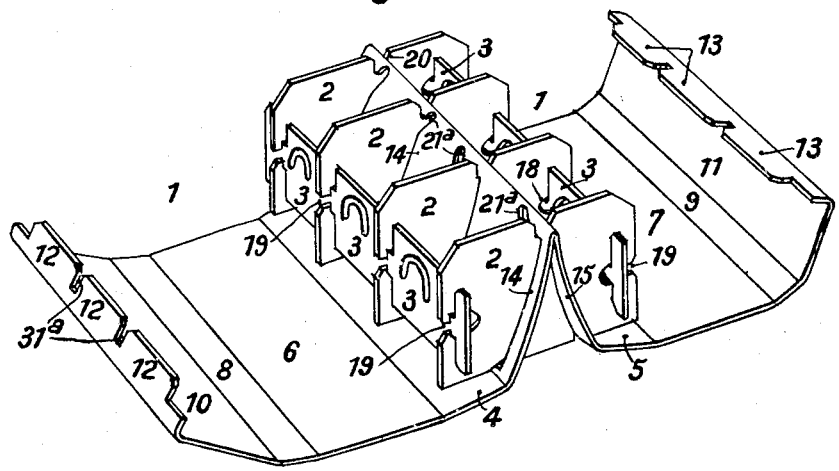
Fig. 1.
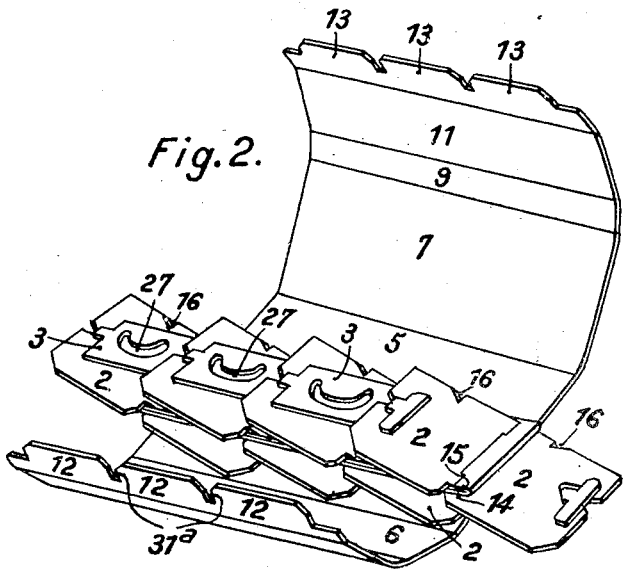
Fig. 2.
Fig. 3.
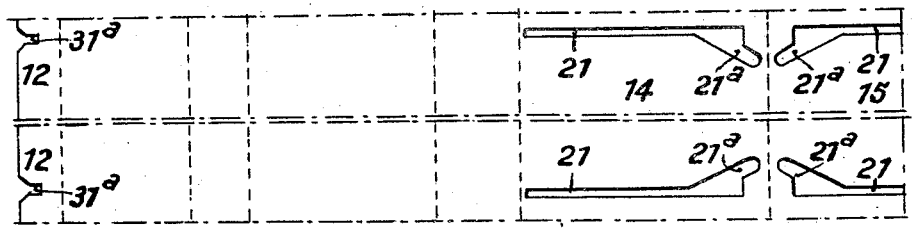
INVENTOR:
GEORGES ALFRED HIPPOLYTE NUYTS
BY: Francis P. Boyce
ATTORNEY Aug. 6, 1935.  G. A. H. NUYTS  2,010,437
COLLAPSIBLE AUTOMATIC ERECTION EGG BOX
Filed May 11, 1934  3 Sheets-Sheet 2
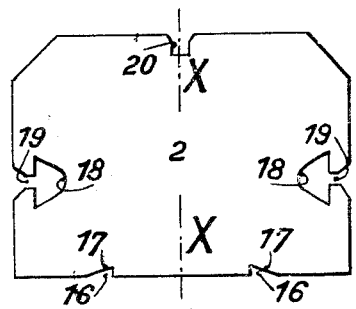
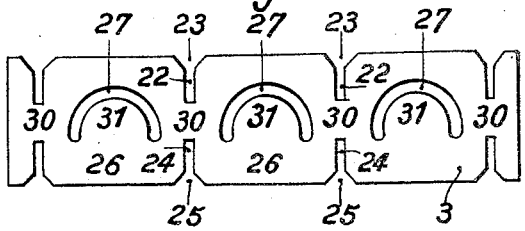
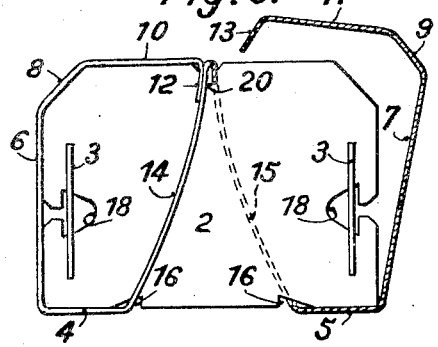
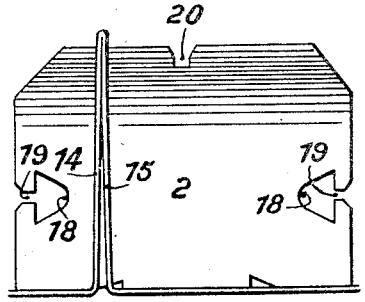
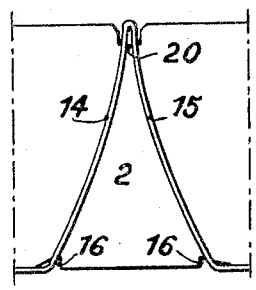
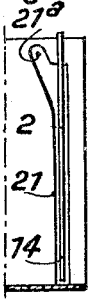
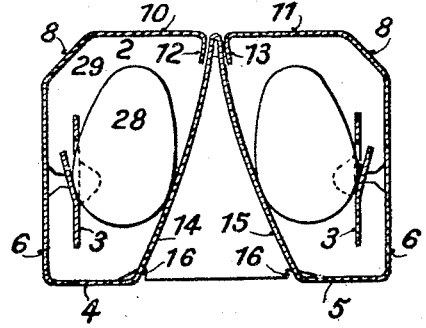
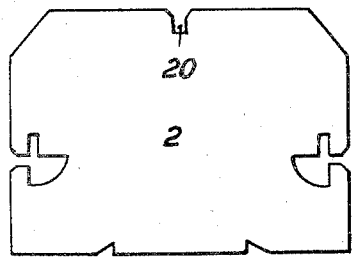
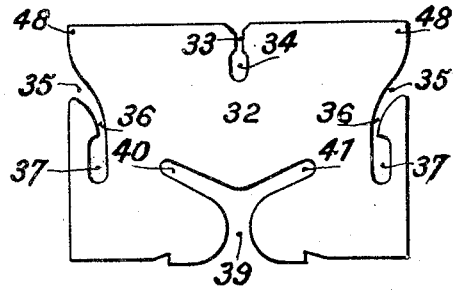
INVENTOR:
GEORGES ALFRED HIPPOLYTE NUYTS
BY: Francis E. Boyer
ATTORNEY Aug. 6, 1935. G. A. H. NUYTS 2,010,437
COLLAPSIBLE AUTOMATIC ERECTION EGG BOX
Filed May 11, 1934     3 Sheets—Sheet 3
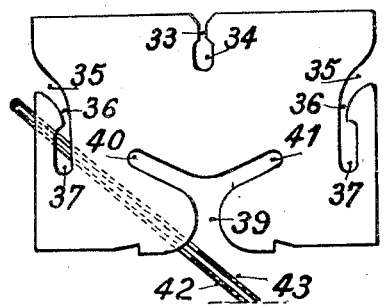
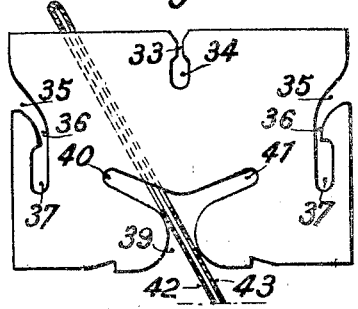
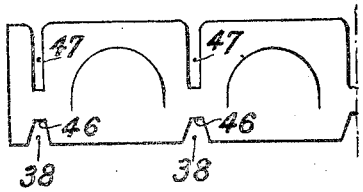
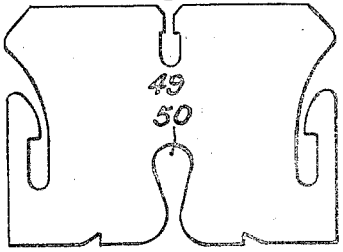
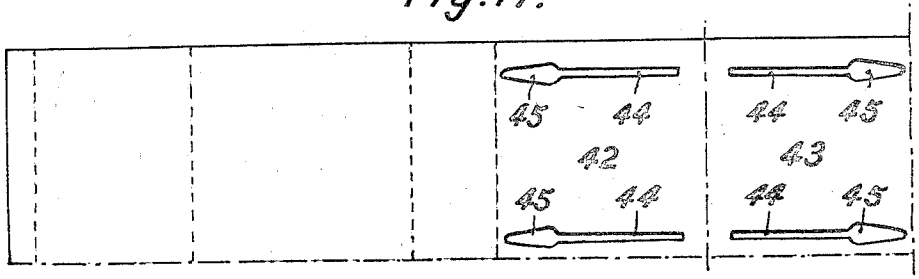
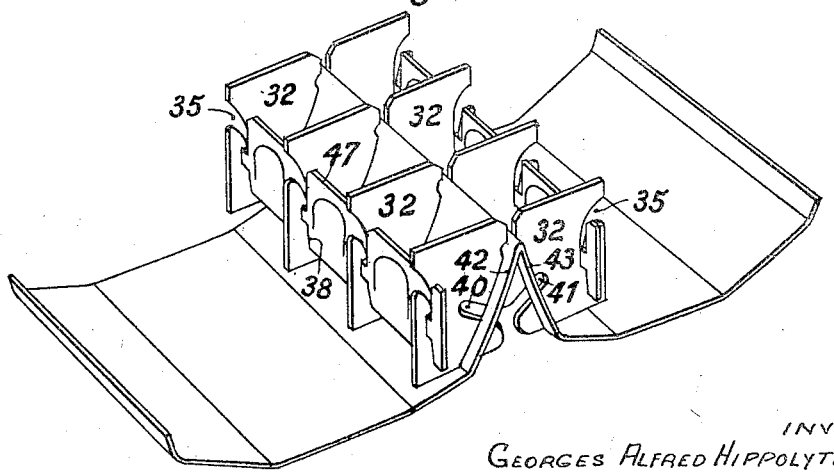
INVENTOR:
GEORGES ALFRED HIPPOLYTE NUYTS
BY: Francis E. Boyce
ATTORNEY Patented Aug. 6, 1935

2,010,437

UNITED STATES PATENT OFFICE 2,010,437

COLLAPSIBLE, AUTOMATIC ERECTION EGG BOX

Georges Alfred Hippolyte Nuyts, Nanterre, France

Application May 11, 1934, Serial No. 725,096
In France February 16, 1934

8 Claims. (Cl. 229—29)

It is well known that there is an ever-increasing general tendency, especially as regards retail, to sell eggs contained in honeycomb boxes, in which they can be transported conveniently and protected from knocks.

In order to reduce the amount of space they take up, the empty boxes are usually collapsible and they are only assembled when they are being filled.

Up till now, the assembly of the same was comparatively complicated and the manual dexterity of the operator had to be taken into account; at all events, it demanded a considerable amount of time.

Further, the eggs contained in the boxes known at present are generally not protected on all sides against possible knocks and, consequently, breakages are not rare.

Many of the boxes used have projections on their outer surfaces, when they are assembled, so that the ease with which they can be handled and their stability are greatly reduced.

Finally, the egg is very often kept in place in its cell by some precarious means only, without consideration of the differences in the sizes of the eggs, which may be very great.

The present invention overcomes these inconveniences. The object of the same is a collapsible honeycomb box, for holding eggs or similar objects, which can be stored flat and which is automatically erected by a single movement on the part of the operator, in this case a tractive movement.

As a result of this movement, the longitudinal and cross partitions forming the limits of the honeycombs spring up and the locking devices, ensuring the rigidity of the box, operate of their own accord.

The immediate corollary of this automatic action is rapidity and reliability of assembly, which enables an operator to form a much larger number of boxes, in the same space of time, than with the old systems, and with a uniformity of perfection which has not been obtained up till the present.

Furthermore, the eggs contained in the cells of the box according to the present invention are protected on all sides from knocks, whatever the points of application may be.

They are nowhere in contact with a wall, the other surface of which may be subject to percussions.

In other words, the outer surface of the box is separated, at all points, from the eggs by a large interval. It will thus be understood that even brutal handling of the egg box has no deleterious effects on its contents.

In this respect, it makes no difference whether all the honeycombs contain an egg or not. Each of the honeycombs itself forms a rigid cell protected on all sides.

A fortiori, the box forms a unit which is rigid in all directions and practically indeformable.

On the other hand, on the walls of the honeycombs, means have been provided for making the walls so elastic that they adapt themselves exactly to the convex shape of the egg, whatever the size of this latter may be.

Furthermore, a large interval exists between the egg and the bottom, so that the extraction of the egg from its cell is facilitated by raising it by putting one's finger into this interval.

Finally, the outer surface of the box has no projections, so that the box can be handled with ease and, as it lies on a large flat surface on all sides, it has perfect stability.

In order to give a precise idea of the matter, a description will now be given, as an example, of a form of execution of an egg box in accordance with the present invention, with reference to the drawings attached hereto, in which:—

Fig. 1 is a general perspective view of the box according to the present invention, ready to receive the eggs;

Fig. 2 is a perspective view of the flattened box;

Fig. 3 shows the development of the casing;

Fig. 4 shows a cross-partition;

Fig. 5 shows a longitudinal partition;

Fig. 6 is a side view of the box in the closed position, with a half-section;

Figs. 7 and 8 show the first phase of the introduction of a cross-partition into the casing, for assembly purposes;

Figs. 9 and 10 show this cross-partition fitted;

Fig. 11 is a cross-section through a plane passing through the middle of an egg;

Fig. 12 shows a modification in the shape of the cross-partition;

Fig. 13 shows an alternative form of the cross-partition;

Fig. 14 shows the first phase in the assembly of this last-named cross-partition;

Fig. 15 shows the second phase in this assembly;

Fig. 16 shows a portion of a longitudinal partition in accordance with the alternative form;

Fig. 17 shows part of the casing developed, in accordance with the said alternative form;

Fig. 18 is a general view of the erected box, in accordance with the said alternative form;

Fig. 19 shows a modification in the shape of the cross-partitions, in accordance with the said alternative form.

The box in accordance with the present invention (Fig. 1) is formed by the assembly of a casing 1, which, when the box is closed, forms the outer walls of this latter, cross-partitions 2 and longitudinal side-walls 3.

The box shown in the drawings comprises six honey-comb cells, but it is evident that this number can be made to vary by simply altering the number of cross-partitions.

In the normal position, i. e. when the box opens at the top, the strips 4 and 5 of the casing form the bottom of the erected box; when closed, the strips 6 and 7, 8 and 9 form the lateral walls, the strips 10 and 11 the upper walls, and the strips 12 and 13 the closing wings.

The strips 14 and 15, forming an inverted V, separate the box in the middle.

The cross-partitions 2 (Fig. 4) have no slots in the underpart. The bottom of the cross-partitions is notched on each side at 16, the sloping part 17 diverging from the centre towards the outside.

At the sides, there are incisions 18 with a narrow opening 19, the compact shape of which contributes to the rigidity of these partitions and which are used for the assembly of the longitudinal partitions 3. The slots 20, in the upper part of the cross-partitions, have simply a rectangular outline. The whole cross-partition is symmetrical with respect to the axis X—X.

Slots 21, for the assembly with the cross-partitions, are provided in the strips 14 and 15 of the V formed by the casing 1.

At one end, these slots are provided with a sloping arm 21a, which rises higher than the non-sloping part of the slot. In certain cases, in order to prevent the cardboard from being torn, this sloping part may end in a small circular opening.

The longitudinal side-walls 3 (Fig. 5) are provided, in their upper part, with slots 22 opening at 23, and, in their lower part, slots 24, opening at 25, are cut out.

The slots 22 and 24 have the same vertical centre line.

On each of the parts 26 marked out by these slots, there is a semicircular incision 27.

Fig. 11 shows a cross-section of the erected box, in its closed position. It is seen that each egg, such as 28, is enclosed in a cell 29, closed on all sides, and the walls of which are two cross-partitions 2, a longitudinal side-wall 3, the strip 14 (or 15) of the casing 1, the strip 4 (or 5), the strip 8 (or 9) and the strip 10 (or 11).

It must be noted that the egg is in no case in contact with the walls 4, 8 and 10 of the cell. In principle, it is held between the longitudinal side wall 3 and the strip 14 (or 15) forming an intermediate partition.

By means of the central parts 30, the longitudinal partition 3 is held in place by the cross-partitions 2.

It is clear that any increase in the pressure exerted by the egg on the strip 14 (or 15) forming the intermediate partition, acts in the locking direction between the strip and the cross-partitions at the level of the notches 16.

Furthermore, the half-moons 31 in the longitudinal partitions 3 are pressed outwards by the weight of the egg and hold the same pressed elastically against the intermediate partition 14 (or 15).

It will thus be understood that the egg, held elastically and so that it is unable to move, cannot be shaken about and knock against the walls of its cell.

The egg enclosed in this way is at no point in contact with any wall, the outer surface of which is liable to be exposed to knocks or external pressure. It is thus effectively protected and, practically, cannot be broken.

Besides, active ventilation can be provided for around each egg through the communication of the different cells with the outer air, thanks to openings made in the cross-partitions 2.

It should also be noted that, as the eggs are held in place individually, their fixture is in no wise affected if the box is only partially filled.

For storage purposes, the empty box has the form shown in Fig. 2.

The thickness of the whole is then insignificant; at the most, it amounts to five times the original thickness of the material of which the box is formed, cardboard, for example, i. e. a few millimetres. It is therefore possible to store a very large number of them in a very small space.

In order to erect the flattened boxes, it suffices to grip the casing at both ends and to pull it.

The cross-partitions and the longitudinal partitions spring up automatically and the locking devices act of their own accord. By this single, simple movement, which takes only a fraction of a second, the box is completely erected and is ready to be filled with eggs.

Pulling the two ends of the casing 1 tends to open the branches of the inverted V formed by the cardboard strips 14 and 15, which was quite flat up till this moment.

These two branches react on the edges of the slots 20 of the cross-partitions 2 and cause the rotation of the said partitions round their axes X—X.

During this rotation, the strips 14 and 15 move along the cross-partitions until they pass the notches 16, which lock the whole.

A characteristic click is then heard. It is impossible to open the box too wide, as the base of the cross-partitions meets the bottom of the slots 21.

The box is flattened by bringing the two branches of the V together and closing them, the strips 14 and 15, which are superposed in this way, being brought into line with the notches 20. The partitions then flatten out of their own accord through the rotation of the longitudinal partitions round the axes X—X.

When the box has been filled, it is closed by inserting the strips 12 and 13 of the casing 1 into the slots 20 provided between the arms of the V and the edges of these slots; the strips are subject to a slight pressure in the same.

The edges of the end strips are preferably notched at 31a at distances corresponding to that between the cross-partitions. All movement of the closing strips with respect to the cross-partitions, in a longitudinal direction, is thus rendered impossible.

The box is opened by means of the inverse procedure.

During these operations, no fragile organ is forced; after the box has been opened and closed several times, it still closes just as completely and reliably.

During the manufacture, the assembly of the box in accordance with the present invention, from the component parts, viz. casing and partitions cut out as described heretofore, is very simple; the cross-partitions are inserted individually slightly warped (position shown in Figs. 7 and 8) opposite the slots 21. They can thus be moved forward with respect to the casing 1. When, during their forward movement, their upper notch 20 reaches the level of the two arms 14 and 15 of the V, which are then close together, the cross partitions straighten up of their own accord and take up their normal assembly position, as shown in Figs. 9 and 10. This shape of the slots 21 is given only as an example. In general, slots are sought which have a part specially arranged for the assembly of the partitions, the height of which is, in certain places, greater than the opening of the slot corresponding to the normal position of the partitions, the partitions being inserted by means of elastic deformation.

When the cross-partitions have been inserted, the longitudinal partitions are assembled, by inserting them edgewise into the narrow opening 19 of the incisions 18; after passing through the said narrow opening, they are turned through an angle of 90°.

The manner in which the cross-partitions are fitted to the casing, on the one hand, and the way in which the longitudinal partitions are fitted to the cross-partitions, on the other hand, result, especially, in the fact that, when the box is folded together, no movement of these elements with respect to each other can be produced, which might hinder their free motion during the process of erection.

Further, in view of the same result, half of the sloping parts 21a of the slots 21 point in one direction, while the others run in the opposite direction (Fig. 3).

In Fig. 12, a modified form of the lateral incisions in the cross-partitions is seen, which ensures the positive fixture of the longitudinal partitions.

Figs. 13 to 19 refer to an alternative form of realization of the box in accordance with the present invention.

In this alternative form, the cross-partitions 32 are provided, along their central axis, in their upper part, with a slot, the entrance to which, 33, is narrow, and which becomes wider at 34. At the side, deep indentations 35 are provided, which become narrower until the neck 36 is reached, and which form the limit, at their lower end, of a small support opening 37 which is closed, except at the said neck 36.

The longitudinal partitions are preferably provided, at their base, with trapeziform incisions 38 (Fig. 16).

In the lower central part of the longitudinal partitions 32, there is a bifurcated slot 39, with the two openings 40 and 41.

In accordance with the alternative form, slots are provided in the strips 42 and 43 of the casing. The said slots occupy almost the whole height of the strips and comprise a rectilinear part 44 ending, at the bottom and, perhaps, at the top, in an olive-shaped opening 45 (Fig. 17).

For purposes of assembly, the cross-partitions are inserted individually, the lower corners of the same being applied to the slots 44, obliquely with respect to the strips 42 and 43, which are then brought together. When the slot 40 (or 41) is opposite the slot 44, the cross-partition is made to slide, with respect to the strips 42—43, so as to bring the bottom of these slots into contact. It is then possible, by skewing around the cross-partition, to insert its corresponding top corner into the slot 44, until the slot 33—34 coincides with the slots 44. The cross-partition is then pushed upwards until the last-named slots have their lower part in contact (Figs. 14 and 15).

The cross-partitions 32 are locked with respect to the casing, in a vertical direction, as a result of the narrowness of the part 33, which the angle of the inverted V can only pass through when the two arms of this latter are pressed firmly together.

When the cross-partitions have been fitted, the lower slots 38 of the longitudinal partitions are brought into a position facing the slots 35 of the cross-partitions.

By pressing the longitudinal partitions lightly downwards, the resistance caused by the neck 36 is overcome and the bottom 46 of the slots 38 comes into contact with the bottom of the support-opening 37. This movement is possible as a result of the slots 47 through which the corners 48 of the cross-partitions can pass. The locking of the longitudinal partitions is ensured by the narrowness of the neck 36.

In all cases, the boxes are dismantled by means of the reverse operation.

Fig. 19 shows a modification of the shape of the cross-partitions 32. These modified cross-partitions 49 are provided, in their underpart, with a slot 50, which is not bifurcated, for introduction into the casing incised in a manner similar to that of the alternative form. The corners of the upper part are cut off, so as to enable the partitions to be inserted into the casing, with the help of the slot 50.

The cross-partitions shown in Fig. 1 have their top corners cut off for the sake of the aesthetic shape of the box and so as to make the latter easy to handle. Besides, the flat part could have several sides.

For certain uses of the folding, automatic-erection box, the presence of longitudinal partitions is not indispensable. This is the case, for example, with tennis balls, golf balls and all objects which are not fragile.

I claim:

1. Folding box comprising a casing, which, when the box is erected, forms a central partition in the shape of an inverted V and the outer envelope of the box, a number of slots in the arms of the said V, comprising an extra sloping part corresponding to the height of the cross-partitions when slightly warped, a number of cross-partitions, two single symmetrical notches at the bottom of the aforesaid partitions, a slot, which is simply rectangular, in the middle of the upper edge of the said partitions, incisions with narrow orifices in the lateral edges of the said partitions, longitudinal side-walls mounted in the aforesaid incisions.

2. Folding box comprising a casing, which, when the box is erected, forms a central partition in the shape of an inverted V and the outer envelope of the box, a number of slots in the arms of the V comprising an extra sloping part corresponding to the height of the cross-partitions slightly warped, a number of cross-partitions, two single symmetrical notches at the bottom of the said partitions, a slot, which is simply rectangular, in the middle of the upper edges of the aforesaid partitions, incisions of semi-oval shape in the lateral edges of the aforesaid partitions, the entry orifice of the said incisions being narrow, longitudinal side-walls mounted in the said incisions.

3. Folding box comprising a casing, which, when the box is erected, forms a central partition in the shape of an inverted V and the outer envelope of the box, a number of slots in the arms of the V comprising a sloping part designed to correspond to the height of the cross-partitions when slightly warped, one half of the said casing slots having their sloping parts running in one direction, while the other half have theirs running in the opposite direction, a number of cross-partitions, two single symmetrical notches in the bottom of the said partitions, a slot, which is simply rectangular, in the middle of the upper edge of the aforesaid partitions, incisions with a narrow orifice in the lateral edges of the aforesaid partitions, longitudinal side-walls mounted in the said incisions.

4. Folding box comprising a casing, which, when the box is erected, forms the central partition in the shape of an inverted V and the outer envelope of the box, a number of rectilinear general guiding slots in the arms of the V, a number of cross-partitions passing through these slots, a bifurcated incision in the lower central part of the said partitions, two symmetrical notches in the lower edge of the said partitions, a slit with a narrow orifice in the middle of the upper edge of the said partitions, incisions provided with a narrow neck in the lateral edges of the aforesaid partitions, longitudinal side-walls mounted in the lateral incisions in the cross-partitions.

5. Folding box comprising a casing, which, when the box is erected, forms the central partition in the shape of an inverted V and the outer envelope of the box, a number of rectilinear general guiding slots in the arms of the V, a number of cross partitions passing through these slots, a non-bifurcated incision in the lower central part of the said partitions, the top corners of the said partitions being flattened, two symmetrical notches in the lower edge of the said partitions, a slit with a narrow orifice in the middle of the upper edge of the aforesaid partitions, incisions provided with a narrow neck in the lateral edges of these partitions, longitudinal side-walls mounted in the lateral incisions of the cross-partitions.

6. A folding box, comprising a blank, forming, when the box is erected, a central partition of inverted V-shape, a plurality of transverse parallel partitions, locked, when erected, in relation to the blank and crossing only the arms of the V, the lateral edges of said partitions being provided with cut outs with narrow entrances, longitudinal terminal partitions, provided along their upper and lower edges with notches adapted to straddle the cut outs of said transverse partitions and being secured therein, an outer cover and a plurality of fastening tongues, formed by the other parts of said blank.

7. A folding egg box including a blank having a longitudinally extending portion forming a central partition of inverted V-shape when erected, transverse partitions extending through said central partition and interlocked therewith, longitudinal partitions interlocked with the transverse partitions and in spaced relation to the end edges of said transverse partitions, the lower edges of said longitudinal partitions being closer to the central partition than the upper edges whereby to form wedge shaped pockets for supporting eggs in spaced relation to the tops and bottoms of the partitions, the remainder of the blank forming bottom, side and top portions and resting against the end edges of the transverse partition to space the box sides from said longitudinal partition, and means to hold the box closed.

8. An egg box including an outer casing having bottom, side and top portions, a central partition of inverted V-shape extending longitudinally of the box, transverse partitions extending through the central partition and between the box sides and supporting the latter, and longitudinal partitions crossing the transverse partitions in spaced relation to the box sides, said partitions forming a series of wedge shaped cells adapted to support eggs out of contact with the top and bottom of the box and in spaced relation to the box sides.

GEORGES ALFRED HIPPOLYTE NUYTS.